(12) United States Patent
Shah et al.

(10) Patent No.: US 11,870,750 B1
(45) Date of Patent: Jan. 9, 2024

(54) ASSISTED SETUP OF DOMAIN NAME REGISTRY

(71) Applicant: Identity Digital Inc., Bellevue, WA (US)

(72) Inventors: Kroopa Shah, Toronto (CA); James Galvin, Toronto (CA); Jimmy Lam, Toronto (CA)

(73) Assignee: IDENTITY DIGITAL, INC., Toronto (CA)

( * ) Notice: Subject to any disclaimer, the term of this patent is extended or adjusted under 35 U.S.C. 154(b) by 0 days.

(21) Appl. No.: 18/305,144

(22) Filed: Apr. 21, 2023

(51) Int. Cl.
  G06F 15/16 (2006.01)
  G06F 9/54 (2006.01)
  H04L 29/06 (2006.01)
  H04L 61/3015 (2022.01)
  H04L 61/4511 (2022.01)

(52) U.S. Cl.
  CPC ........ H04L 61/302 (2013.01); H04L 61/3025 (2013.01); H04L 61/4511 (2022.05)

(58) Field of Classification Search
  CPC ............... H04L 61/302; H04L 61/3025; H04L 61/4511; G06F 16/27; G06F 16/2365
  USPC ........................................................ 709/245
  See application file for complete search history.

(56) References Cited

U.S. PATENT DOCUMENTS

| | | | | |
|---|---|---|---|---|
| 8,195,652 B1 * | 6/2012 | Parsons | .............. | G06Q 30/0241 707/723 |
| 11,552,948 B1 * | 1/2023 | Peterson | ............. | H04L 63/0876 |
| 2011/0060950 A1 * | 3/2011 | Waldron | ............. | G06F 11/1469 714/48 |
| 2016/0179769 A1 * | 6/2016 | Gershom | ............ | H04L 61/3025 715/235 |
| 2018/0103008 A1 * | 4/2018 | Slaunwhite | ......... | H04L 61/3025 |
| 2019/0364011 A1 * | 11/2019 | Nguyen | .............. | G06F 16/9535 |
| 2019/0379637 A1 * | 12/2019 | Phoenix | .............. | H04L 61/3025 |
| 2020/0250200 A1 * | 8/2020 | Lam | ...................... | H04L 61/302 |
| 2020/0351241 A1 * | 11/2020 | Bajaj | ................... | G06F 16/9535 |
| 2021/0234696 A1 * | 7/2021 | Kaliski, Jr | .......... | H04L 63/0807 |
| 2021/0328968 A1 * | 10/2021 | Kamdar | .............. | H04L 61/3025 |
| 2022/0078207 A1 * | 3/2022 | Chang | ................... | G06F 40/194 |
| 2022/0131831 A1 * | 4/2022 | Stahura | ................ | H04L 61/302 |
| 2023/0043891 A1 * | 2/2023 | Raemy | ............... | H04L 61/3025 |
| 2023/0155834 A1 * | 5/2023 | Kaliski, Jr | ............. | G06F 21/33 709/220 |

* cited by examiner

Primary Examiner — Hamza N Algibhah
(74) Attorney, Agent, or Firm — Haynes and Boone, LLP (57) ABSTRACT

A gateway server and methods operating as a web service providing a self-serve methodology for establishing a domain name registry over a communications network, comprising: receiving a request from the computing device to establish the domain name registry of a specified type; determining the specified type requires ICANN approval and receiving access credentials of the RO; confirming completion of a Registry Agreement between ICANN and the RO; collecting registry technical information for the domain name registry from the computing device; using the access credentials to access via the communications network the RO account on the server during a registry testing phase of the self-serve methodology to complete registry services testing for the domain name registry with ICANN; and updating a workflow interface with a completion status of the registry testing phase for subsequent access by the computing device of the RO over the communications network.

26 Claims, 6 Drawing Sheets

ASSISTED SETUP OF DOMAIN NAME REGISTRY

FIELD

The present invention is related to setup and management of domain name registries.

BACKGROUND

Domain names are used in various networking contexts and application-specific naming and addressing purposes. In general, a domain name represents an Internet Protocol (IP) resource, such as a personal computer used to access the Internet, a server computer hosting a web site, or the web site itself or any other service communicated via the Internet. In 2014, the number of active domains reached 271 million. Today's Internet presence by companies is considered a critical element of their business.

There are a number of good reasons for having a domain name. If you ever change your web host, your domain name goes with you. Your regular visitors or customers who knew your site name would not have to be informed about a change of web address (also known as "URL"). They would simply type your domain name and they'd be brought to your new site. If you are a business, a domain name gives you credibility. Few people will be willing to do business with a company that does not have its own domain name. If you get a domain name that describes your company's business or name, people can remember the name easily and can return to your site without having to consult their documents.

It is a disadvantage with the current domain name set up methodology to properly and easily set up a new domain name registry, including interaction required or not in conjunction with ICANN. It is critical that registry information relating to the new domain name registry be complete, consistent, accurate, and up to date. As such, it is critical that in set up, domain name records (both registry and DNS data) must be consistent and up to date in order to prevent undesirable expense, complication and worst-case loss of domain name rights. The coordination involved for domain set up in today's multi-TLD universe is becoming increasingly complex, due to the increased availability in the number and variety of domain names.

BRIEF DESCRIPTION OF THE DRAWINGS

Exemplary embodiments of the invention will now be described in conjunction with the following drawings, by way of example only, in which.

SUMMARY

It is an object of the present invention to provide a system and method for setting up domain name registries to obviate or mitigate at least some of the above presented disadvantages.

A first aspect provided is a gateway server operating as a web service providing a self-serve methodology for establishing a domain name registry over a communications network using machine-to-machine interaction involving the gateway server and a computing device of a registry operator (RO) for the domain name registry, the gateway server comprising: a network interface for communicating with the computing device over the communications network; a processor and associated memory having instructions stored thereon for execution by the processor to communicate with the computing device by: receiving a request from the computing device to establish the domain name registry of a specified type; determining the specified type requires ICANN approval and receiving access credentials associated with the RO for an RO account with ICANN hosted on a server; using the access credentials to access via the communications network the RO account on the server for contributing to completion of a Registry Agreement with ICANN on behalf of the RO during an application phase of the self-serve methodology; collecting registry technical information for the domain name registry from the computing device; using the access credentials to access via the communications network the RO account on the server for communicating the registry technical information to the server on behalf of the RO during a registry testing phase of the self-serve methodology in order to complete registry services testing for the domain name registry with ICANN; and updating a workflow interface with a completion status of the registry testing phase for subsequent access by the computing device of the RO over the communications network.

A second aspect provided is a gateway server operating as a web service providing a self-serve methodology for establishing a domain name registry over a communications network using machine-to-machine interaction involving the gateway server and a computing device of a registry operator (RO) for the domain name registry, the gateway server comprising: a network interface for communicating with the computing device over the communications network; a processor and associated memory having instructions stored thereon for execution by the processor to communicate with the computing device by: receiving a request from the computing device to establish the domain name registry of a specified type; determining the specified type requires ICANN approval and receiving access credentials of the RO for an RO account with ICANN hosted on a server; confirming completion of a Registry Agreement between ICANN and the RO; collecting registry technical information for the domain name registry from the computing device; using the access credentials to access via the communications network the RO account on the server for communicating the registry technical information to the server on behalf of the RO during a registry testing phase of the self-serve methodology in order to complete registry services testing for the domain name registry with ICANN; and updating a workflow interface with a completion status of the registry testing phase for subsequent access by the computing device of the RO over the communications network.

A third aspect provided is a gateway server operating as a web service providing a self-serve methodology for establishing a domain name registry over a communications network using machine-to-machine interaction involving the gateway server and a computing device of a registry operator (RO) for the domain name registry, the gateway server comprising: a network interface for communicating with the computing device over the communications network; a processor and associated memory having instructions stored thereon for execution by the processor to communicate with the computing device by: receiving a request from the computing device to establish the domain name registry of a specified type; determining the specified type requires ICANN approval and receiving access credentials of the RO for an RO account with ICANN hosted on a server; confirming completion of a registry testing phase, said completion based on registry technical information for the domain name registry collected from the computing device; collecting launch phase parameters for the domain name registry from the computing device, the launch phase parameters for use during a launch phase of the self-serve methodology; using the access credentials to access via the communications network the RO account on the server for communicating the launch phase parameters to the server on behalf of the RO during the launch phase in order to complete a configuration of the launch phase for the domain name registry with ICANN; and updating a workflow interface with a completion status of said configuration of the launch phase for subsequent access by the computing device of the RO over the communications network.

DETAILED DESCRIPTION OF THE PREFERRED EMBODIMENT(S)

Figure 1:
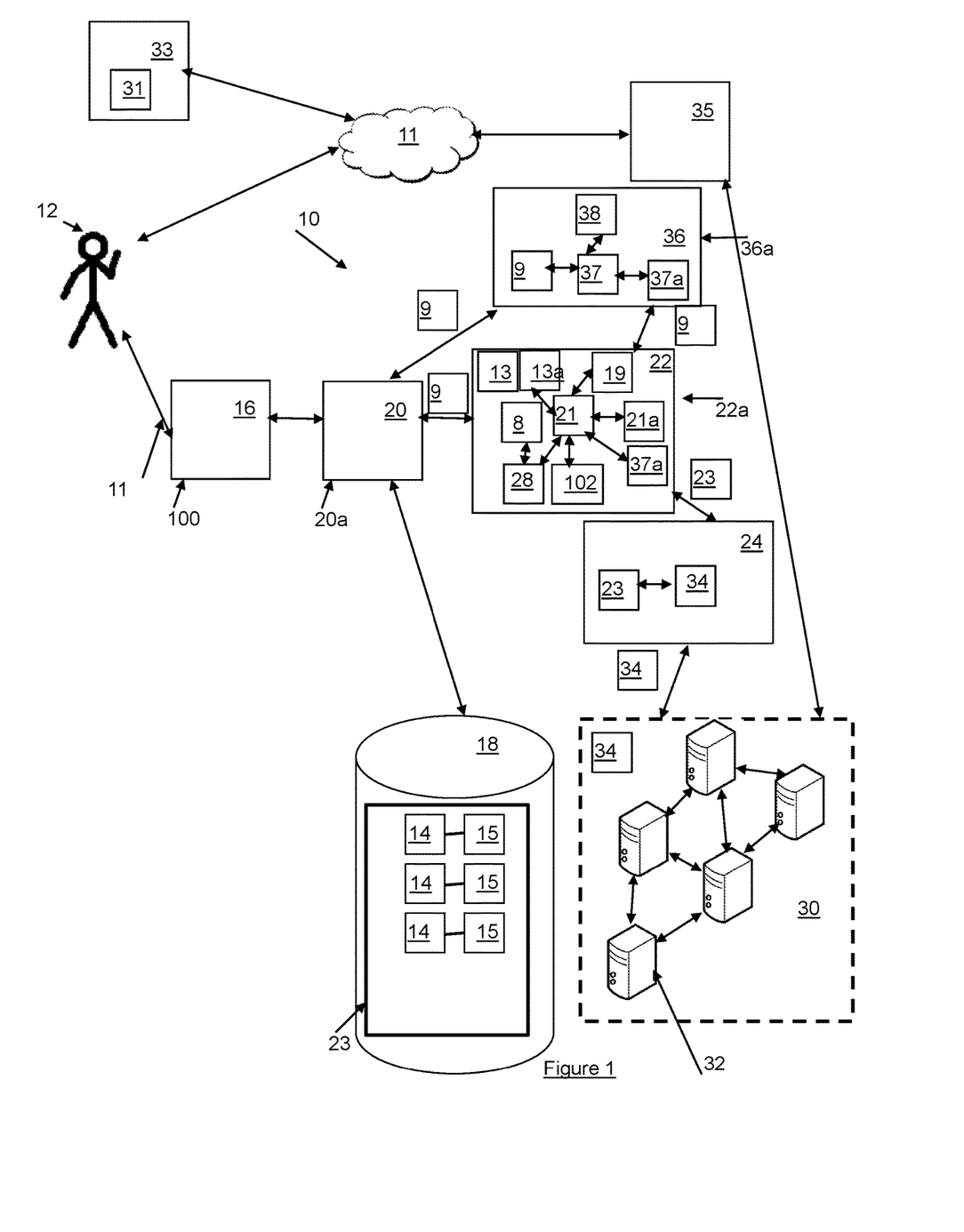
FIG. 1 is a block diagram of components of a domain name transition system.

Referring to FIG. 1, shown is a Top Level Domain (TLD) registration system 10 facilitating a registry operator 20 (e.g. TLD administrator) to request 9 (e.g. over a communications network 11, i.e. the Internet) a setup of one or more new TLDs 14. It is recognized that each TLD 14 would have a plurality of individual domain names associated therewith. It is recognized that one or more registrars 16 can be utilized by registrants 12 to purchase these domain names under the TLD(s) 14, once setup. The registry operator 20 is responsible for storing registry data 23 for the TLD(s) 14 in a registry database 18, once the TLD(s) 14 are setup via assistance (e.g. via implementation of a self-serve methodology 200—see FIG. 2) provided by a registry services provider 22. The content of the registry data 23, once setup, is meant to be maintained by the registrant 12 and the registrar(s) 16 via (e.g. Extensible Provisioning Protocol EPP) transactions conducted with the registry operator 20 in order to create/update and otherwise maintain the content of the registry data 23 in the registry database 18 during operation of the TLDs(s) 14.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. For example, the communications network 11 can also include Bluetooth™ associated elements. It is recognised that the registrar 16, the registry operator 20 and the registry services provider 22 can be implemented on computer devices 20a, 22a, 36a, 100 (see FIG. 3) such as servers and can communicate with one another via the network 11 in client-server relationships, in order to implement set up, operation and maintenance of the TLDs 14.

Referring again to FIG. 1, the registry services provider 22 and the registry operator 20 can be in communication with Internet Corporation for Assigned Names and Numbers (ICANN) 36, implemented on one or more servers 36a, recognizing that ICANN 36 is an organization responsible for coordinating the maintenance and procedures of several databases related to the namespaces and numerical spaces (e.g. TLDs 14) of the Internet 11. One task that ICANN 36 does is to address the issue of domain name ownership resolution for generic top-level domains (gTLDs) 14, provided a as type of domain name registry 14. In particular, a registry agreement 38 between the registry operator 20 and ICANN 36 must be established during an application phase I (stage 1—see FIG. 2) of the self-serve methodology 200 for specified type TLDs 14, i.e. gTLDs, which is facilitated by a workflow interface 102, see below. It is noted that in particular, completion of the Registry Agreement 38 with ICANN is needed in order for the registry operator 20 to set up the new TLD(s) 14 for a specified type TLDs 14, i.e. gTLDs. Further, it is recognise that phase I can be skipped for those TLDs 14 which are not administered by ICANN 36, e.g. ccTLDs 14. The self serve methodology 200 can include an application phase I, a registry system testing phase II and a registry launch phase III (stage 3—see FIG. 2).

As further described below, advantages of the phase I Application process include:
1) for gTLDs, there can be detailed interaction with ICANN to complete it's part of the process;
2) the system 10 can provide the technical response component and facilitate the rest;
3) for ccTLDs, the process includes just what is needed to apply for the ccTLD and agree to a relationship; and/or
4) type/category of the TLD 14 and various configuration options are to be specified.

As further described below, advantages of the phase II Testing process include:
1) a technical review of the technical service provider is provided by ICANN for gTLDs 14, this would be managed here;
2) for the transfer-in of any existing registry managing data import would be here
safe mode registry transition could be applicable; and
3) DNSSEC rollovers to move DNS would be here.

As further described below, advantages of the phase III Launch process include:
1) details of the configuration would be set;
2) details of the pricing/marketing would be set;
3) managing the accreditation of registrars;
4) multiple phases/steps are provided to get through to get to general availability for new gTLDs 14;
5) if there is a portfolio of TLDs 14 to be managed, then technical bundling can be applicable here for assigning multiple related TLDs 14 to a common bundle identified by a bundle ID as part of the metadata associated with the grouping (i.e. bundle) of TLDs 14 (and implicitly each TLD of the bundle).

Referring again to FIG. 1, the registry services provider 22 can be used to coordinate (i.e. assist) the setup of the new TLD(s) 14 for the registry operator 20, as well as to coordinate via a DNS publication system 24 the generation and publication of DNS data 34 that reflects the contents of the new registry data 23, one set up via interaction between the registry services provider 22, the registry operator 20 and ICANN 36, as further described below. The DNS publication system 24 is used to generate and publish zone files (e.g. DNS data 34) out to the DNS 30 (used by resolver servers 35 and DNS servers 32 to convert domain names of the TLDs 14 to IP addresses). It is recognized that the DNS data 34 is based on data content of the registry data 23, once set up.

It is recognized that the registry services provider 22 cooperates with the registry operator 20 in order to facilitate the setup of the TLD(s) 14 as new TLD(s) 14, including an application process, a testing process, and a launch process as further described below.

For example, the registry services provider 22 interfaces directly with ICANN 36 on behalf of the registry operator 20 during the setup of the new TLD(s) 14, providing an important advantage in that the registry services provider 22 can function as a mediator on behalf of the registry operator 20 with ICANN 36, such that the registry services provider 22 can facilitate the setup of the new TLD(s) 14 including collection and dissemination of registry data 23 pertinent to the creation of the new TLD(s) 14 with required approval of ICANN 36. As further described below, the collection and dissemination of information can also include application information 9 used in the creation of a registry agreement between the registry operator 20 and ICANN 36 for those applicable type TLDs 14.

As further discussed below, an advantage of implementation of the system 10 is one-stop "shopping" for the registry operator 20, in consultation with the registry services provider 22 (and the applicant). For example, broadly there can be two or mote categories of TLDs 14, e.g. gTLDs, cTLDs, etc.

Figure 2:
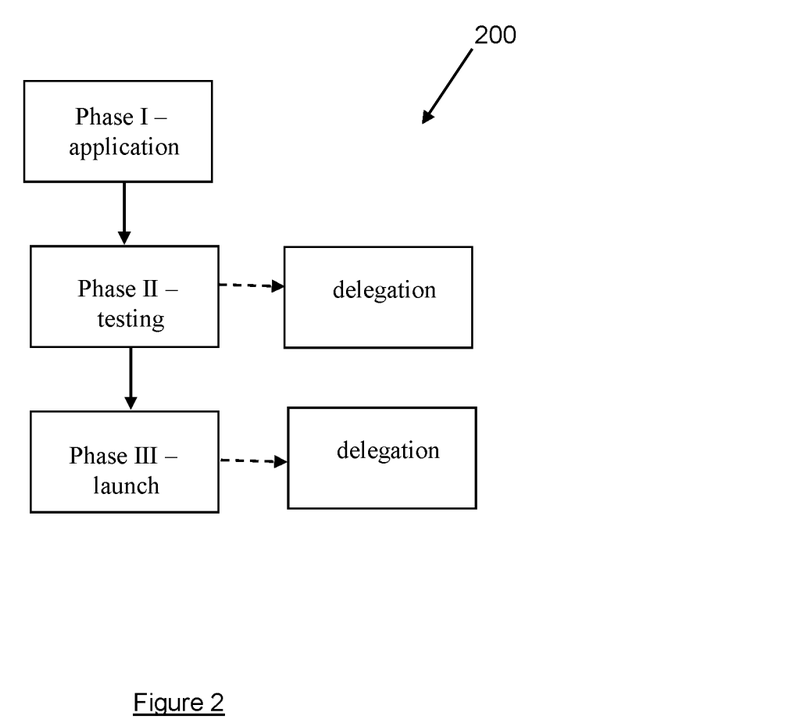
FIG. 2 is an overview flowchart of setup activities implemented by the self serve methodology on the system of FIG. 1.

The registry services provider 22 exposes a workflow interface 102 (used as a data transfer mechanism between the gateway server 22a and the computing device 20a) to the registry operator 20 over the network 11, such that the workflow interface 102 can be used to represent progress/ status of the application/set up process for the new TLD(s) 14, as facilitated via implementation of the self-serve methodology 200 (see FIG. 2). The registry operator 20 has a contractual relationship (further described below in reference to a registry services agreement 19) with the registry services provider 22 and thus also has an operator account 21 with the registry services provider 22. This registry account 21 would be provided access to the workflow interface 102, in conjunction with account login credentials 21a. As such, once the registry operator 20 establishes the operator account 21 with the registry services provider 22, the registry operator 20 would have access to the workflow interface 102 upon login (i.e. the registry operator 20 uses the granted account login credentials 21a to access to the workflow interface 102). As further described below, the workflow interface 102 is used by the registry operator 20 and the registry services provider 22 to communicate with one another concerning the status and required actions needed to set up the new TLD(s) 14.

The registry operator 20 could also have an operator account 37 with ICANN 36, also having respective account login credentials 37a. Accordingly, in order for the registry services provider 22 to act on behalf of the registry operator 20 with ICANN 36, the registry operator 20 would also provide (to the registry services provider 22) and thus have associated the account login credentials 37a with the registry account 21. Once associated, the registry services provider 22 can use the account login credentials 37a when contacting ICANN 36 via the network 11 on behalf of the registry operator 20. In other words, it is the use of the operator login credentials 37a that facilitates the registry services provider 22 to interact with ICANN 36 on behalf of the registry operator 20 so as to uniquely identify that the registry services provider 22 is associated with and thus authorized to represent the registry operator 20 in interactions with ICANN 36 (with the registry services provider 22) to coordinate completion of the registry agreement 38.

Referring again to FIG. 1, the workflow interface 102 used by the registry operator 20 can be for providing updates including a completion status of a registry testing phase II (stage 2—see FIG. 2), by accessing by a computing device 20a of the registry operator 20 over the communications network 11. For example, the workflow interface 102 can be an Application Programming Interface (API) exposed by a gateway server 22a (of the registry services provider 22) to the computing device 20a over the communications network 11. Alternatively or in addition to, the workflow interface 102 can be a dashboard accessible by the computing device 20a over the communications network 11. For example, the dashboard can be a portion of the API.

As further described below, the new TLD(s) 14 will be assigned a specified type (e.g. ccTLD, gTLD), recognizing that the specified type of gTLD requires execution of a registry agreement 38 while the specified type of the ccTLD does not require the execution of a registry agreement 38. That being said, it is recognized that the application phase I of the self-serve methodology 200 would be skipped for those new TLD(s) 14 not requiring a registry agreement 38 (e.g. ccTLDs 14). For example, a gTLD 14 is an example, of an open membership type domain name registry and a ccTLD 14 is an example of a closed membership type domain name registry. It is recognized that once the registry agreement 38 is ready for execution, the registry operator 20 can access same by the operator account 37 (directly with ICANN 36) or can access the available registry agreement 38 via the workflow interface 102. It is the registry operator 20 itself that must execute (e.g. sign) the registry agreement 38 (which is a contract between the registry operator 20 and ICANN 38 dictating general setup and implementation provisions for the new TLD(s) 14). It is recognized that the specified type of the new TLD(s) 14 will dictate the appropriate application information 9 needed to complete the registry agreement 38.

In view of the above, the Registry Agreement 38 once completed can be received from the server 36a over the communications network 11 and then subsequently provided by the gateway server 22a to the computing device 20a, thus representative of the gateway server 22a being the channel for ICANN 36 communication with the registry operator 20 over the network 11. Further, it is recognized that the Registry Agreement 38 can be made accessible to the computing device 20a via the workflow interface 102. (e.g. a document link provided via the dashboard).

Referring to FIGS. 1 and 2, during the application phase I, there is a collection of application information 9 (e.g. considered to contain some of the registry data 23) from the registry operator 20, which can used in completing the registry agreement 38 with ICANN for the appropriate specified type (e.g. gTLDs 14). Preferably, the registry services provider 22 interacts with the registry operator 20 (via the workflow interface 102) to collect at least a portion of the application information 9 and then forward the collected (e.g. portion of) the application information 9 to ICANN 36. It is also recognised that a portion of the application information 9 collected from the registry operator 20 (by the registry services provider 22) can have originated from ICANN 36. For any application information 9 collected by the registry services provider 22, the registry services provider 22 would use the account login credentials 37a in order to update the operator account 37 with the application information 9 collected (e.g. transmit the application information 9 over the network 11 to the operator account 37 provided by ICANN 36). Accordingly, ICANN 36 would use the application information 9 available in the operator account 37 to complete all application information 9 required by the registry agreement 38. It is also recognized that the registry operator 20 could access their operator account 37 directly over the network 11, using their account login credentials 37a, and thus provide directly (e.g. a portion of) the application information 9. The application information 9 can include information pertinent to a Contracting Information Request (CIR) form supplied by ICANN 36, including indication of contact details for an individual authorized to interact with Internet Assigned Numbers Authority (IANA) to address matters relating to the delegation (implemented once phase II is complete) of the new TLD(s) 14, as well as indication of the TLD 14 as a standard open TLD or as a named variant of a brand/closed TLD, designation/identification of registrar(s) 16 to be associated with the new TLD(s) 14.

It is recognised that that the application information 9 can include administration information 15 (see example objects 15 below). It is recognised that that the application information 9 can include registry technical information 13, such as but not limited to technical and financial tasks required of a registry demonstrating that the registry operator is technically capable of running the new TLD 14. This can include information such as but not limited to: dates (e.g. start-end) of sunrise notification and commencement; date of landrush/limited registration commencement; date of general availability commencement; domain pricing matrix for all defined periods/dates (e.g. renewal fees); designation of premium/reserved domains; designation of registrar(s) 16, and any other launch plans and policies. Some of the technical information 13 can also be referred to as launch information 13a, to be used to implement the launch phase III of the self serve methodology 200.

It is recognised that at least a portion of the provided application information 9 gets input into the registry agreement 38 and thus is eligible for approval/denial by ICANN 36 as part of the application phase I.

An example list of the application information 9 can include information content related to intended DNS record information (allowing operability with the Domain Name System protocols of the DNS 30); WHOIS records information containing registration information about registered domain names; EPP implementation information of the protocol used for electronic communication between the registrar 16 and the registry operator 20 for provisioning domain names under the TLD(s) 14; Internationalized Domain Name (IDN) information defining rules foe domain names that include characters not written with the basic Latin alphabet (a-z); Data Escrow information associated with data deposits of the registry data 23 with applicable Data Escrow Agents; and/or Documentation information including self-certification documents (XML) to account for required elements. In general, the registry agreement 38 defines critical registry functions that are needed in order for the new TLD(S) 14 to be operated in a stable and secure manner, such as compliance with relevant DNS/DNSSEC 30 specifications and the Service Level Requirements described in the Registry Agreement 38, including the successful performance of key (e.g. ZSK and KSK) rollovers during the simulation period of the testing.

Accordingly, in view of the above, the registry services provider 22 can use the account access credentials 37a to access via the communications network 11 the operator account 37 on the server 36a for contributing to completion of the Registry Agreement 38 with ICANN 36 on behalf of the registry operator 20 during the application phase I of the self-serve methodology 200. For example, the contributing to the completion of the Registry Agreement 38 can include querying the computing device 20a by the computing device 22a for the application information 9 of the domain name registry 14 (e.g. TLD 14), the application information 9 relevant to the completion of the Registry Agreement 38. Further, the contributing to the completion of the Registry Agreement 38 can include reviewing by the computing device 22a of the Registry Agreement 38 prior to the completion of the Registry Agreement 38, the reviewing including confirming appropriate parameters relevant to the registry testing phase II (e.g. Registry System Testing RST) are complete. Further, the computing device 22a can query the computing device 20a for application information 9 of the domain name registry 14, the application information 9 relevant to the completion of the Registry Agreement 38, wherein information content of the application information 9 is based on the specified type (e.g. indicating the content of the query would be based on the TLD type such as but not limited to ccTLD or gTLD).

Once the application information 9 is completed, the computing device 22a can update a completion status of receipt of the application information 9 to the workflow interface 102. Further, it is recognised that the workflow interface 102 can be used as a session based tool by the computing device 22a (e.g. gateway server), such that a state of the set-up of the new TLD(s) 14 is saved between sessions, such that each session starts and ends with a login/logout process utilizing the operator account credentials 21a. In this manner, the workflow interface 102 can be used by the registry operator 20 to determine a status of the set up of the new TLD(s) 14 at any time (e.g. what phase I, II, III the set up is at and what steps have been completed or not completed within each phase I, II, III).

The registry services provider 22 can also be used by the registry operator 20 to supply registry services 8 to the registry operator 20, such as but not limited to: domain name abuse monitoring and other domain security services; registry services such as EPP services, Escrow support, restricted/reserved namelists, etc; DNS services including DNSSEC and mitigation systems for Denial of Service attacks; registry compliance and support services such as TM clearing house and registrar 16 accreditation; ICANN policy services such as ICANN policy updates and support services; and/or security services such as monitoring and reporting of abuse.

It is recognised that one of the services 8 provided by the registry services provider 22 can be coordinating the registry agreement 38 between the registry operator 20 and ICANN 36. It is preferred that the registry operator 20 execute a registry services agreement 28 with the registry services provider 22, which would define the type of registry services 8 provided to the registry operator 20 by the registry services provider 22. For example, the gateway server 22a can communicate over the network 11 with the computing device 20a in order to establish the Registry Services Agreement 28 between the registry operator 20 and the registry services provider 22. For example, the Registry Services Agreement 28 can be established before the registry operator 20 communicates over the network 11 the registry technical information 13 to the gateway server 22a. Further, the gateway server 22*a* can query the computing device 22*a* for the technical services information 13 detailing a list of technical services to be associated with the domain name registry 14 currently being set up. As such, it is a option of the self-serve methodology 200 to have the gateway server 22*a* query for the technical services information 13 before completion of the registry testing phase II, which is representative of an advantage of the system 10 to spawn parallel processes during the various phases I, II, III of the self-serve methodology 200. As advantageously provided by the workflow interface, the registry operator 20 can be informed thereby by the gateway server 22*a* by accessing an update of the workflow interface 102 indicating a completion status for receipt of the technical services information 13.

In view of the above, the workflow interface 102 can be used by the gateway server 22*a* to indicate the status of the self-serve methodology 200. For example, the workflow interface 102 can present a completed application information 9 status, indicating that all relevant application information 9 has been submitted by the registry operator 20 to the registry services provider 22. For example, the workflow interface 102 can present an executed registry agreement 38 status, indicating that the registry agreement 38 has been approved by ICANN 36. It is recognised that the approval of the registry agreement 38 by ICANN 36 allows the new TLD(s) 14 to be eligible for registry system testing (i.e. phase II), in other words approval from ICANN 36 is required before the self-serve methodology 200 can proceed from phase I to phase II or form phase II to phase III. For example, the workflow interface 102 can present completed phase II status, indicating that the registry testing phase II has been completed and thus also approved by ICANN 36, in other words approval from ICANN 36 is required before the self-serve methodology 200 can proceed to delegation upon completion of the registry system testing implemented during phase II. For example, the workflow interface 102 can present completed delegation status, indicating that the delegation of the new TLD(s) 14 has been completed, in other words that the new TLD(s) 14 have been entered into the root zone of the DNS 30 (see FIG. 1). Once the permission is granted and the TLD(s) 14 are entered into the root zone, the TLD 14 is thereby given an individual space in the root zone, after which registry operators 20 can begin their process of offering registrations via the registrar(s) 16 associated with the new TLD(S) 14, either within their own network for closed TLDs 14, or to the public, for open TLDs 14.

Figure 4A:
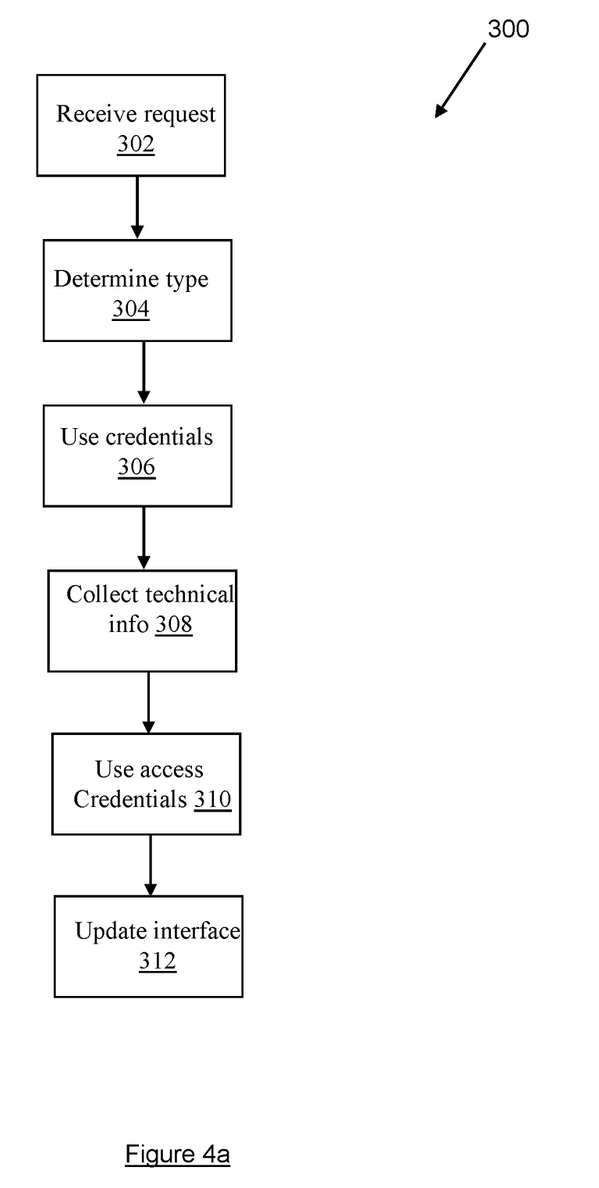
FIG. 4*a* is a flowchart of an example implementation for the system of FIG. 1.

Referring to FIGS. 1, 2 and 4*a*, shown is an example operation 300 of the self-serve methodology 200 of FIG. 2, provided by example as the gateway server 22*a* operating as a web service provides the self-serve methodology 200 for establishing a domain name registry 14 (e.g. TLD 14) over a communications network 11 using machine-to-machine interaction involving the gateway server 22*a* and a computing device 20*a* of a registry operator 20 for the domain name registry 14. The gateway server 22*a* utilizes the network interface 102*a* for communicating with the computing device 20*a* over the communications network 11 (and for providing the workflow interface 102), along with the processor 108 and associated memory 122 having instructions 105 stored thereon for execution by the processor 108 to communicate with the computing device 20*a* for executing the steps of the operation 300.

At step 302, the gateway server 22*a* receives a request from the computing device 20*a* to establish the domain name registry 14 of a specified type. At step 304, the gateway server 22*a* determines the specified type requires ICANN 36 approval and receives access credentials 37*a* associated with the registry operator 20 for the operator account 37 with ICANN 36 hosted on the server 36*a*. At step 306, the gateway server 22*a* uses the access credentials 37*a* to access via the communications network 11 the operator account 37 on the server 36*a* for contributing to completion of a Registry Agreement 38 with ICANN 36 on behalf of the registry operator 20 during an application phase I of the self-serve methodology 200. At step 308, the gateway server 22*a* collects registry technical information 13 for the domain name registry 14 from the computing device 20*a*. At step 310, the gateway server 22*a* uses the access credentials 37*a* to access via the communications network 11 the operator account 37 on the server 36*a* for communicating the registry technical information 13 to the server 36*a* on behalf of the registry operator 20 during a registry testing phase II of the self-serve methodology 200 in order to complete registry services testing for the domain name registry 14 with ICANN 36. At step 312, the gateway server 22*a* updates a workflow interface 102 with a completion status of the registry testing phase II for subsequent access by the computing device 20*a* of the registry operator 20 over the communications network 11.

Figure 4B:
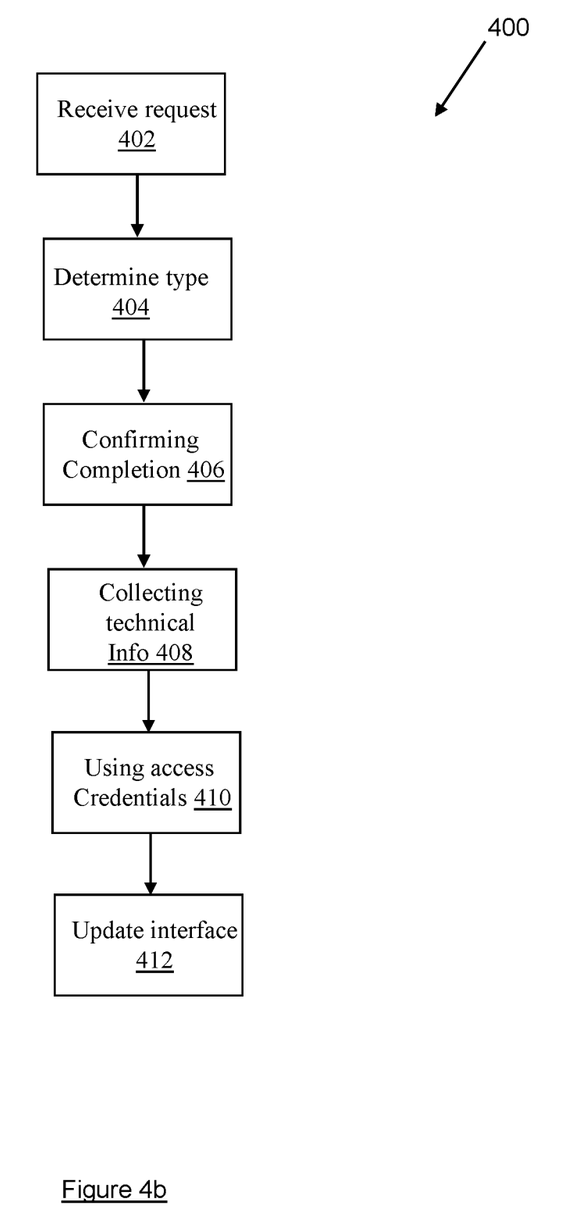
FIG. 4*b* is a flowchart of a further example implementation for the system of FIG. 1.

Referring to FIGS. 1, 2 and 4*b*, shown is an example operation 400 of the self-serve methodology 200 of FIG. 2, provided by example by the gateway server 22*a* skipping phase I. The gateway server 22*a* operates as a web service providing a self-serve methodology 200 for establishing a domain name registry 14 over a communications network 11 using machine-to-machine interaction involving the gateway server 22*a* and a computing device 20*a* of a registry operator 20 for the domain name registry 14, the gateway server 22*a* includes a network interface 102*a* for communicating with the computing device 20*a* over the communications network 11 and a processor 108 and associated memory 122 having instructions 105 stored thereon for execution by the processor 108 to communicate with the computing device 20*a* by the steps of: receiving 402 a request 9 from the computing device 20*a* to establish the domain name registry 14 of a specified type; determining 404 the specified type requires ICANN 36 approval and receiving access credentials 37*a* of the registry operator 20 for an operator account 37 with ICANN 36 hosted on a server 36*a*; confirming 406 completion of a Registry Agreement 38 between ICANN 36 and the registry operator 20; collecting 408 registry technical information 13 for the domain name registry 14 from the computing device 20*a*; using 410 the access credentials 37*a* to access via the communications network 11 the operator account 37 on the server 36*a* for communicating the registry technical information 13 to the server 36*a* on behalf of the registry operator 20 during a registry testing phase II of the self-serve methodology 200 in order to complete registry services testing for the domain name registry 14 with ICANN 36; and updating 412 a workflow interface 102 with a completion status of the registry testing phase II for subsequent access by the computing device 20*a* of the registry operator 20 over the communications network 11.

Figure 4C:
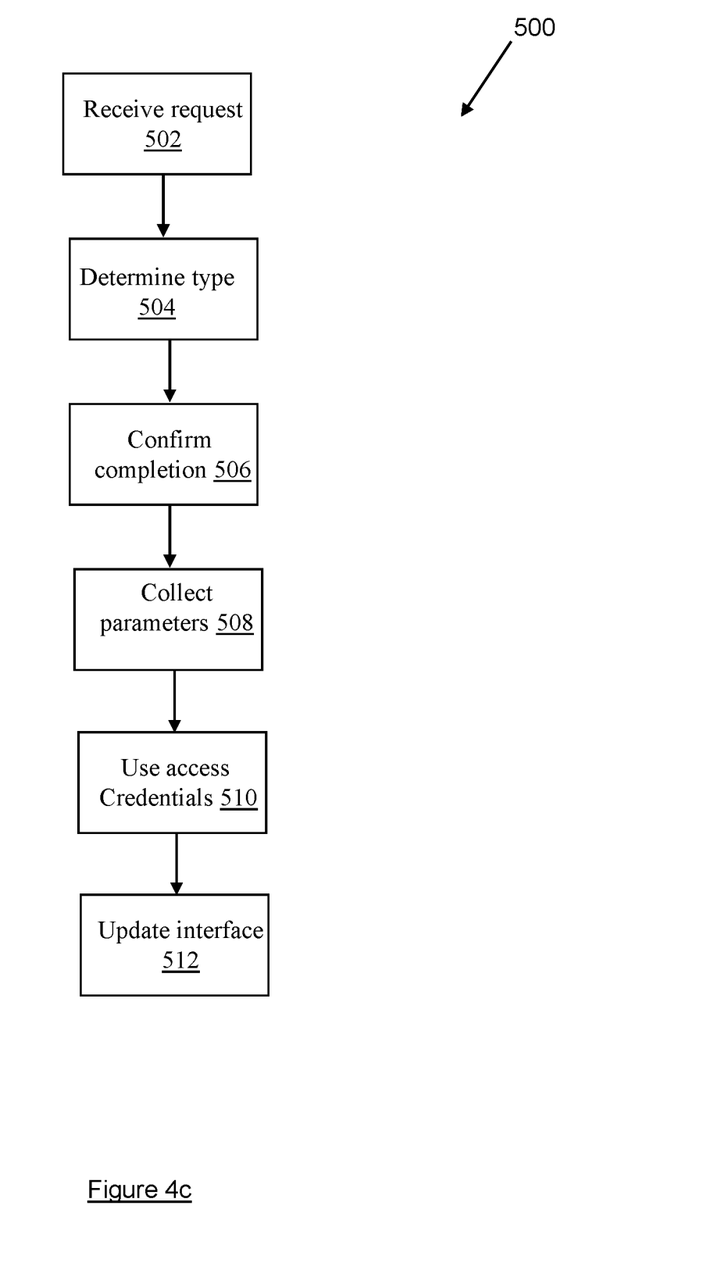
FIG. 4*c* is a flowchart of a still further example implementation for the system of FIG. 1.

Referring to FIGS. 1, 2 and 4*c*, shown is an example operation 500 of the self-serve methodology 200 of FIG. 2, provided by example for implementing phase III. The gateway server 22*a* operates as a web service providing a self-serve methodology 200 for establishing a domain name registry 14 over a communications network 11 using machine-to-machine interaction involving the gateway server 22*a* and a computing device 20*a* of a registry operator 20 for the domain name registry 14, the gateway server 22*a* includes a network interface 102a for communicating with the computing device 20a over the communications network 11 and a processor 108 and associated memory 122 having instructions 105 stored thereon for execution by the processor 108 to communicate with the computing device 20a by the steps of: receiving 502 a request from the computing device 20a to establish the domain name registry 14 of a specified type; determining 504 the specified type requires ICANN 36 approval and receiving access credentials 37a of the registry operator 20 for an operator account 37 with ICANN 36 hosted on a server 36a; confirming 506 completion of a registry testing phase II, the completion based on registry technical information 13 for the domain name registry 14 collected from the computing device 20a; collecting 508 launch phase parameters 13a for the domain name registry 14 from the computing device 20a, the launch phase parameters 13a for use during a launch phase III of the self-serve methodology 200; using 510 the access credentials 37a to access via the communications network 11 the operator account 37 on the server 36a for communicating the launch phase parameters 13a to the server 36a on behalf of the registry operator 20 during the launch phase III in order to complete a configuration of the launch phase III for the domain name registry 14 with ICANN 36; and updating 512 a workflow interface with a completion status of said configuration of the launch phase for subsequent access by the computing device of the RO over the communications network.

It is recognised that the launch phase parameters 13a can be such as but not limited to: date/schedule parameters and pricing parameters for launching of the TLD(s) 14. Further, the operations 400, 500 can include the step of using the access credentials 37a to access via the communications network 11 the operator account 37 on the server 36a for completing delegation of the domain name registry 14, thereby providing delegation information of the domain name registry 14 to the operator account 37. For example, the delegation can occur after the registry testing phase II and before beginning the configuration of the launch phase III. Also, delegation can happen after beginning of the launch phase III, as desired.

Further to the above, for example, one task performed during the registry system testing phase II can be controlled interruption, which is defined by a 90 day controlled interruption period. For new gTLDs 14, the controlled interruption testing can be implemented by placing a specific set of resource records 34 into the DNS 30. These resource records 34 are selected to hint to system administrators that they should diagnose and correct their systems to prevent potential issues in the future. The purpose of the controlled interruption is to catch errant DNS queries. When an errant query is caught, a "controlled" action can be taken to inhibit harm and alert the user that a fix is needed. That action can take the form of responding to the DNS query with a special IP address (127.0.53.53).

Other registry systems testing that can be performed during the phase II can include: DNS—Testing operability with the Domain Name System protocols; WHOIS—Testing the records containing registration information about registered domain names; EPP—Testing the implementation of the protocol used for electronic communication between a registrar and a registry for provisioning domain names; Internationalized Domain Name (IDN)—Reviewing and/or testing domain names that include characters not written with the basic Latin alphabet (a-z); Data Escrow—Testing to ensure that registries are able to make successful data deposits with their Data Escrow Agents; and/or Documentation—Review of self-certification documents (XML) to ensure required elements are accounted for. It is recognized that once performed, the testing phase II results must be approved by ICANN 36. Accordingly, once testing of phase II is complete, then the new TLD(s) 14 can be delegated and go live.

Once the TLD(s) 14 go live (e.g. are launched), it is recognized that in general, registrant 12 itself can communicate directly with the registrar 16, the registry operator 20 and/or the registry services provider 22 for registration and/or maintenance purchased domain names of the TLD(s) 14. Further, registry operator 20 can supply any requested respective registry 23 and/or maintenance information to registry services provider 22 on behalf of registrar 16.

Domain Names of TLDs 14

In general, a domain name under a TLD 14 is an identification string that defines a realm of administrative autonomy, authority, or control on the Internet 11, whereby domain names are formed by the rules and procedures of the DNS 30. Domain names are used in various networking contexts and application-specific naming and addressing purposes, as an Internet Protocol (IP) resource 31, such as a personal computer used to access the Internet 11, a server computer 33 hosting a web site 31, or the web site 31 itself or any other service communicated via the Internet 11. Domain names are organized in subordinate levels (subdomains) of the DNS root domain, which is referred to as the root zone, and is represented as a single dot ("."). The first-level set of domain names are the TLDs 14. Below these TLDs 14 in the DNS 30 hierarchy are the second-level and third-level domain names that are typically open for reservation by end-users who wish to connect local area networks to the Internet 11, create other publicly accessible Internet resources 31 or run web sites 31. There can be fourth- and fifth-level domains, and so on, with virtually no limitation. The registration of these domain names is usually administered by domain name registrars 16 who sell their services to the public (i.e. registrants 12). As such, the domain can be selected from the group consisting of: a TLD 14 (Top Level Domain); a second level domain (2LD); and a third level domain (3LD), for example.

Individual Internet host computers can use domain names as host identifiers, or hostnames. Hostnames can be defined as the leaf labels in the domain name system usually without further subordinate domain name space and can appear as a component in Uniform Resource Locators (URLs) for Internet resources 31 such as web sites 31 having one or more web pages 31. Domain names of TLDs 14 can also be used as simple identification labels to indicate ownership or control of a resource 31, such as realm identifiers used in the Session Initiation Protocol (SIP), DomainKeys used to verify DNS domains in e-mail systems 31, and in many other Uniform Resource Identifiers (URIs). For example, the domain name can be a component of a (URL) used to access web sites 31, for example: URL—http://www.example.info/index.html, Top-level domain name 14: info, Second-level domain name: example.info, Host name: www.example.info.

Domain names of TLDs 14 can consist of one or more parts, technically called labels, which are conventionally concatenated, and delimited by dots, such as example.info. Not that the rightmost dot, representing the root zone, is many times omitted in the vernacular—it should be implied if not specified (e.g. for the domain name expressed as "example.info", the Fully Qualified Domain Name would be "example.info."). The right-most label conveys the TLD 14, for example, the domain name www.example.info falls under the TLD .info. The hierarchy of domains descends from the right to the left label (or from left to right depending upon language considerations) in the name; each label to the left specifies a subdivision, or subdomain of the domain to the right. For example: the label example specifies a node example.info as a subdomain of the info domain, and www is a label to create www.example.info, (e.g. a subdomain or otherwise an element of the domain) of example.info. A hostname is a domain name that has at least one associated IP address. For example, the domain names www.example.info and example.info may also be hostnames, whereas the info domain is not. However, other TLDs 14, particularly country code top-level domains, may indeed have an IP address, and if so, they are also hostnames. It is recognized that hostnames can impose restrictions on the characters allowed in the corresponding domain name. A valid hostname is also a valid domain name, but a valid domain name may not necessarily be valid as a hostname.

Referring again to FIG. 1, the TLD registry database 18 can contain those domain names that are registered for a specific TLD 14, which is one of the domains immediately under the highest level in the hierarchical Domain Name System (DNS) 30 of the Internet 11. Practically speaking, domain names are installed in the root zone of the name space for the TLD 14 and for all domains in lower levels, the domain name is the last part of the TLD 14, that is, the last label of a fully qualified TLD 14, with the trailing dot for the root zone designation. It is recognized that there can be a number of different TLD 14 types, such as but not limited to: country-code top-level domains (ccTLD) consisting of two letter domains established for countries or territories; internationalized country code top-level domains (IDN ccTLD) which are ccTLDs in non-latin character sets (e.g., Arabic or Chinese) which are displayed in end-user applications in their language-native script or alphabet but use a Punycode-translated ASCII domain name in the Domain Name System 30; generic top-level domains (gTLD) which are top-level domains with three or more characters (e.g. GOV, EDU, COM, MIL, ORG, NET and INFO) including unsponsored top-level domains which are domains that operate directly under policies established for the global Internet community and sponsored top-level domains (sTLD) that are proposed and sponsored by private agencies or organizations that establish and enforce rules restricting the eligibility to use the TLD 14; and infrastructure top-level domain that is one domain, the Address and Routing Parameter Area (ARPA) managed on behalf of the Internet Engineering Task Force for various purposes specified in the Request for Comments publications.

Domain names of the TLDs 14 can be formed from the set of alphanumeric ASCII characters (a-z, A-Z, 0-9), but characters are case-insensitive. In addition, the hyphen can be permitted if it is surrounded by a characters or digits, i.e. it is not the start or end of a label. Labels are separated by the full stop (period) character in the textual name representation, and are limited to 63 characters in length. It is recognized that the domain names can be represented using characters based in other languages as well, including alternate formats as appropriate, as desired.

TLDs 14 can be referred to as domains and registrants 12 can be referred to as domain owners, although domain registration with the registrar 16 may not confer any legal ownership of the TLD 14, only an exclusive right of use for a particular duration of time. As such, the TLD 14 (and their associated domain names) can be considered an economic asset utilized as an identification string defining a realm of administrative autonomy, authority or control within the Internet 11.

In general, the TLD 14 can be setup or otherwise maintained/renewed for a TLD registrant 12 (e.g. domain owner) via a registrar 16 for one or more TLDs 14 available (e.g. not yet claimed) or otherwise owned in the TLD registry database 18 (e.g. a database of all domain names registered in a top-level domain (TLD) 14).

As further described below, the DNS data 34 are based on resource records (e.g. Name Server name/address records, Delegation Signer records, etc.) associated with the registry data 23 of particular TLD(s) 14. It is recognized that DNSSEC related resource records are not stored in the registry database 18, as these can be generated on the fly by a DNS publication system 24 using the generation instructions associated with the TLDs 14. It is also recognized that the DNS data 34*a,b* can include other data specific to the DNS zone itself (e.g. the zone apex).

DNS 30

In terms of importance to functioning of the Internet 11 for searching for and accessing Internet 11 resources, domain names of the TLD(s) 14 serve as names for these Internet 11 resources such as computers, networks, and services. The domain name represents an Internet Protocol (IP) resource and specifically, individual Internet host computers use domain names as host identifiers, or host names (e.g. leaf labels in the domain name system usually without further subordinate domain name space). Of importance to Internet 11 navigation, host names appear as a component in Uniform Resource Locators (URLs) for Internet 11 resources such as web sites (e.g., Afilias.info). Domain names can also be used as simple identification labels to indicate ownership or control of a resource. Such examples are the realm identifiers used in the Session Initiation Protocol (SIP), the Domain Keys used to verify DNS domains in e-mail systems, and in many other Uniform Resource Identifiers (URIs). An important function of domain names is to provide easily recognizable and memorizable names to numerically addressed Internet 11 resources. Usability of the domain names as an abstraction provides any resource to be moved to different physical locations in the address topology of the network 11, globally or locally in an intranet. Such a move usually involves changing the IP address of the resource and the corresponding translation of this IP address to and from its domain name.

Referring to FIG. 1, shown are network resources 31, which are accessible via a specified URI (over the network 11) of the server 33 incorporating the domain name associated with the specified TLD 14 maintained in domain name registry 18*a,b*, using an appropriate network communications protocol (e.g. SMTP, HTTP, HTTPS, etc.). For example, the network communications protocol includes rules for data formats for data exchange and rules for network address formats for data exchange that identify both the sender network 11 address and the intended receiver(s) network 11 address. In computing, the URI is a string of characters used to identify a name or a resource. Such identification enables interaction with representations of the resource over a network (typically the Internet) using the specific protocols. Schemes specifying a concrete syntax and associated protocols define each URI, such that URIs can be classified as locators (URLs), as names (URNs), or as both. A uniform resource name (URN) functions like a person's name, while a uniform resource locator (URL) resembles that person's street address. In other words: the URN defines an item's identity, while the URL provides a method for finding the item over the network 11.

Referring again to FIG. 1, shown is a Domain Name System (DNS) publication system 24 for coordinating and publishing DNS records (e.g. DNS data 3 including one or more Resource Record sets—RR sets) in the DNS 30 containing DNS servers 32 (e.g. Authoritative servers). Although only one DNS publication system 24 is depicted in FIG. 1, it is recognised the registry operators 20 could have their own dedicated/separate DNS publication system 24. In other words, once the TLD 14 is set up, and/or during the process of set up of the TLD 14, the new registry operator 20 would use their own DNS publication system 24.

The DNS servers 32 provide DNS services for users of network 11 (e.g. Internet) resources 31 (e.g. as provided by a plurality of distributed web servers 33, mail servers 33, etc., as coordinated through various TLDs 14 of the network 11). It is recognized that in general, network resources 31 can be provided by one or more registry operators (e.g. via registry databases), including external links to mail servers and/or other websites based on web page return results. The distributed servers 33 can rely upon one or more resolver servers 35, by which the network user ultimately accesses network resources 31 via the DNS 30.

Further, it is recognized that zone data, e.g. the DNS data 34 of a TLD 14, is representative of a text file that describes a portion of the DNS 30 called a DNS zone, including the owner of the record. A zone data (e.g. the DNS data 34*b*) is organized in the form of resource records and contains information that defines mappings between TLDs 14 and IP addresses and other resources 31, as based upon registry data 23. For example, the DNS data 34 contains the DNS records in wire transfer format, as implemented in the DNS 30. The format of zone data can be defined by a standard, with each line typically defining a single resource record 26. A line begins with a domain name, but if left blank, can default to the previously defined domain name. Following the domain name can be the time to live (TTL), the class (which is almost always "IN" for "internet" and rarely included), the type of resource record (A, MX, SOA, etc.), followed by type-specific data such as the IPv4 address for A records. Comments can be included by using a semi-colon and lines can be continued by using parentheses. There are also directives that are marked with a keyword starting with a dollar sign.

In general, the DNS data 34 (aka DNS records or zone files also referred to as a Resource Record transfer/transaction 34) are instructions that are published (e.g. transmitted or eventually transmitted to the DNS servers 32) by the DNS publication service 24 to the (authoritative) DNS servers 32. The DNS data 34 provides information about a TLD 14 including what IP addresses are associated with that TLD 14 and how to handle requests (e.g. DNS requests from the users) associated with network resources 31 for that domain names of that TLD 14. For example, a DNS record can be defined as a single entry of the DNS data 34 that gives zone instructions on how to handle any given DNS 30 related request based on record type. In general, most every DNS record has at least three pieces of information, namely: a Record Name; Record Value/Data; and Time to Live (TTL). These DNS records consist of a series of text files written in what is known as DNS syntax. DNS syntax can be a string of characters used as commands, which instruct the DNS server 32 what to do upon receiving a DNS lookup request from the network user, for example. All DNS records can also have the 'TTL', which stands for time-to-live, and indicates how often a DNS server 32 would refresh that particular DNS record. Accordingly, all domains are required to have at least a few essential DNS records for the user to be able to access the website(s) associated with the TLD 14, amongst other optional additional DNS 30 implemented functionality.

Registry Data 23

In view of the above, it is recognized that the registry data 23, some of which can be obtainable from the registry database 18 for the particular TLD 14, can be such as but not limited to: A Records 26—which are the most basic type of DNS record and are used to point a domain or subdomain to an IP address (e.g. assigning a value to an A record is associated with an IP address to where the domain or subdomain should point and a TTL; CNAME records—which are used to point a domain or subdomain to another hostname, for example as a means of being able to change an IP address of a server or cluster of servers; Mail Exchanger (MX) records—which are used to help route email according the domain owners preference, such that the MX record itself specifies which server(s) to attempt to use to deliver mail to when this type of request is made to the domain; and TXT records—which are used to store any text-based information, for example used to hold SPF data and verify domain ownership. Other registry data 23 pertinent to resource records can include: a NS record—storing the name server for a DNS entry; DNSKEY record—the 'DNS Key Record' contains a public key used to verify signatures; CDNSKEY record—a child copy of the DNS-KEY record, meant to be transferred to a parent; CERT record—the 'certificate record' stores public key certificates; DCHID record—the 'DHCP Identifier' stores info for the Dynamic Host Configuration Protocol (DHCP), a standardized network protocol used on IP networks; DNAME record—the 'delegation name' record creates a domain alias, just like CNAME, but this alias will redirect all subdomains as well; HIP record—uses 'Host identity protocol', a way to separate the roles of an IP address used most often in mobile computing; IPSECKEY record—The 'IPSEC key' record works with the Internet Protocol Security (IPSEC), an end-to-end security protocol framework and part of the Internet Protocol Suite (TCP/IP); and SSHFP record—storing the 'SSH public key fingerprints', SSH stands for Secure Shell and it's a cryptographic networking protocol for secure communication over an unsecure network. In general, it is recognized that only unsigned registry data 23 can be contained in the registry database 18.

Registration and maintenance of TLDs 14 involves management of objects 15 associated with each of the domain names of the TLD(s) 14 stored in the registry database 18*a,b*. These objects 15 are populated with appropriate data based on action(s) performed on the objects 15 (e.g. update/modification, delete/del, transfer, renew, etc.). Example actions on the objects 15 are such as registration/purchase of the domain names by the registrant 12 from the registrar 16. Other example actions on the objects 15 can include management by the Registry Operator 20*a,b* of up-to-date data in the objects 15 concerning domain name and name server registrations maintained by the Registry Operator 20*a,b*, useful in verifying and providing operational stability of Registry Services and the DNS.

Example Objects 15

The specification of the content and format of this data of the objects 15 for example TLD(s) 14 (recognizing that different TLDs 14 can have a different set of parameters—e.g. for ccTLDs 14) can be such as but not limited to:

1. Registrar objects. The registrar object corresponds to a single registrar. It includes the following data:

Registrar ID (conforming to the LANA registrar-ids registry)
Contact ID of Registrar
Registrar Administrative Contacts
Registrar Technical Contacts
Registrar Billing Contacts
Registrar URL
Registrar Creation Date
Registrar Last Updated Date
2. Contact objects. The contact object corresponds to a single contact (whether registrant, administrative, technical or billing contact). The contact object includes the following data:
Contact ID
Contact Name
Contact Organization
Contact Address, City, State/Province, Country
Contact Postal Code
Contact Phone, Fax, E-mail
3. Nameserver objects. A nameserver object corresponds to a single registered nameserver. The nameserver object includes the following data:
Name Server ID
Name Server Host Name
Name Server IP Addresses if applicable
Current Registrar
Name Server Creation Date
Name Server Last Updated Date
4. Domain objects. The domain object corresponds to a single Registered Name. Each domain object includes the following data:
Domain ID
Domain Name
Sponsoring Registrar
Domain Status
All contact information (including all details) with at least one each of:
 Registrant
 Administrative
 Technical
 Billing
All nameservers associated with this domain
Domain Registration Date
Domain Expiration Date
Domain Last Updated Date As such, the registration and/or maintenance information is considered data used to populate the objects 15 based on actions (e.g. EPP transactions such as but not limited to update, delete, transfer, renew, etc.) performed on the objects 15 as associated with the TLD(s) 14.

Example Actions

An action is defined as an operation on an object 15 unique to each of the plurality of domain names of the TLDs 14. An example action can be assigning the domain names to a new domain name registrant 12. Alternative actions can include actions such as but not limited to check, info/status, update/mod, delete/del, transfer, and/or renew. The action can be based on a protocol such as Extensible Provisioning Protocol (EPP) or Registry Registrar Protocol (RRP). The Extensible Provisioning Protocol (EPP) is a flexible protocol designed for allocating objects within registries over the Internet. EPP provides a robust and flexible protocol that facilitates transaction communications between domain name registry service providers 22, registry operators 20, and domain name registrars 16. These transactions are used whenever a domain name is acted upon using actions such as to effect data content of the domain name objects 15 to reflect registered, transferred, renewed or otherwise amended domain names. As such, the EPP protocol is used to implement an order (request action on an object) and fulfilment (perform and report result of object when acted upon) system. Specified in XML, EPP provides four basic service elements: a greeting, commands (e.g. actions), responses (e.g. to the actions effecting changes to data content of the objects 15 associated with the actions), and an extension framework that supports future definition of managed objects 15 and the relationship of EPP protocol requests (e.g. actions) and responses to those objects 15. It is recognised that actions of EPP are expressed as XML, a structured, text-based format, such that communication over the network 11 of the actions between entities 16,18,20,22 can be specified over TCP communication messaging and/or other transport communication messaging such as BEEP, SMTP, or SOAP. The registry databases 18 can also contain a transaction log/history (e.g. EPP) containing all operations (a consequence of actions) executed on the objects 15 of the domain names, such that the log/history indicates the domain name by domain name ID along with details of the operation(s) (e.g. time of transaction, success of transaction, type of operation, etc.).

In general, it is recognised that the entities 16,18, 20, 22 can interact on the network 11 with one another in client server pairs. For example, the registrar 16 can be the EPP client and the registry database 18 (with associated registry operator 20) can be the paired EPP server. In general, an EPP server responds to a successful connection by returning a greeting to the client. The client waits for the greeting before sending an EPP command (i.e. action) to the server. EPP commands and responses are exchanged serially between the client and the server over the network 11, in order to affect the data contents of the corresponding objects 15 (of the registry data 23) that are acted upon by the action implemented by the server (i.e. as requested by the client). The server responds to each EPP command with a coordinated response that describes the results of processing the command.

EPP commands fall into three categories: session management commands, query commands, and data transform commands. Session management commands are used to establish and end sessions with an EPP server. Query commands are used to perform read-only, object-based information retrieval operations with respect to data contents of the objects 15. Transform commands are used to perform read-write object management operations with respect to the data contents of the objects 15.

EPP provides commands to manage sessions, retrieve object information, and perform transformation operations on objects. All EPP commands are atomic and idempotent, either succeeding completely or failing completely and producing predictable results in case of repeated execution. EPP provides three commands/actions to retrieve object information: action <info> to retrieve detailed information associated with a known object, action <ping> to determine if an object is known to the server, and action <transfer> to retrieve known object transfer status information. EPP provides five commands/actions to transform (i.e. modify the data contents of the object 15) objects 15: action <create> to create an instance of an object 15 with a server, action <delete> to remove an instance of an object 15 from a server, action <renew> to extend the validity period of an object 15, action <update> to change information associated with an object 15, and action <transfer> to manage changes in client sponsorship (e.g. change in registrant 12) of a known object 15. As such, instance of an object 15 refers to the specific data contents of an object 15. EPP uses four decimal digits to describe the success or failure of each EPP command. The four digits of the reply each have special significance. The first digit denotes whether the response submitted by the server back to the client marks command success or failure. A client that wants to know approximately what kind of error occurred (command syntax error, security error, system error, etc.) can examine the second digit. The third and fourth digits are used to provide explicit information detail by the server to the client with respect to the results of command execution and object 15 data contents change thereby.

In view of the above descriptions of storage 18 for the computer devices (see FIG. 3) of registry operator 20 and service 22 storage 18 can be configured as keeping the stored data (e.g. objects 15) in order and the principal (or only) operations on the stored data are the addition/amendment of or removal of the stored data from storage 18 (e.g. FIFO, FIAO, etc.). For example, storage 18 can be a linear data structure for containing and subsequent accessing of the stored data and/or can be a non-linear data structure for containing and subsequent accessing of the stored data.

Further, storage 18 receives various entities such as data that are stored and held to be processed later. In these contexts, storage 18 can perform the function of a buffer, which is a region of memory used to temporarily hold data while it is being moved from one place to another (i.e. between the between computer devices). Typically, the data is stored in the memory when moving the data between processes within/between one or more computers. It is recognised that storage 18 can be implemented in hardware, software, or a combination thereof. The storage 18 is used in the network system 10 when there is a difference between the rate/time at which data is received and the rate/time at which the data can be processed (e.g. ultimately by the devices).

Further, it will be understood by a person skilled in the art that memory/storage 18 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 18 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 18 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 18 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server (acting as a client or as a server of a classic client-server relationship), it is recognised that the computer devices 20a, 22a, 36a, 100 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 11. The computer devices implementing functionality of registry operator 20, registrars 16, and service 22 can provide specialized services across the network 11, for example to private users inside a large organization or to public users via the Internet 11. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 11 environment. In this client—server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Figure 3:
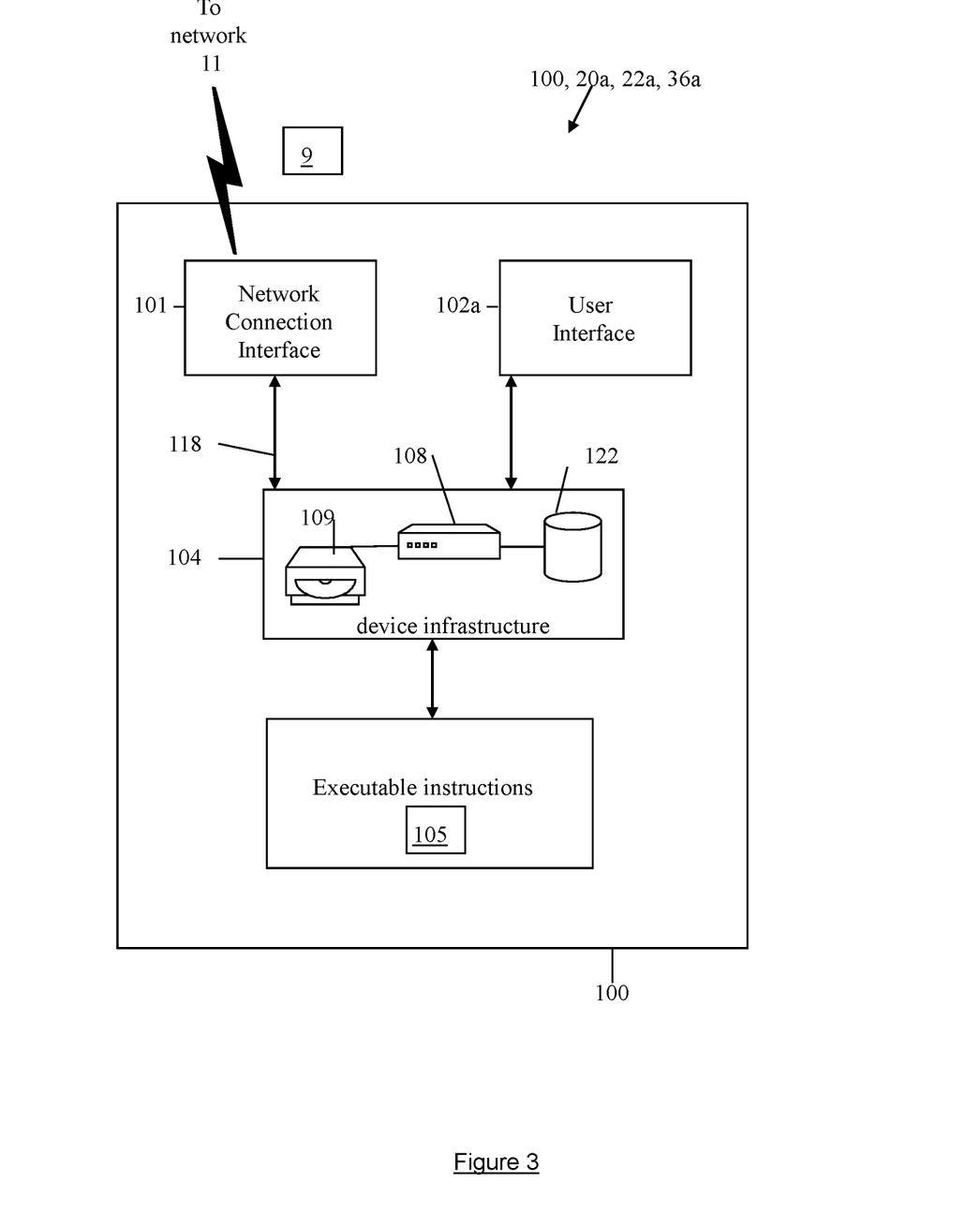
FIG. 3 is an example configuration of a computer device hosting the client or server devices utilized in FIG. 1.

Referring to FIG. 3, a computing device 100 implementing functionality of registry operator 20, registrars 16 and service 22 can include a network connection interface 101, such as a network interface card or a modem, coupled via connection 118 to a device infrastructure 104. The connection interface 101 is connectable during operation of the devices to the network 11 (e.g. an intranet and/or an extranet such as the Internet), which enables the devices to communicate with each other as appropriate. The network 11 can support the communication of the communications on the network 11, as well as between the servers 32, 33, 35 and the related content.

Referring again to FIG. 3, the device 100 can also have a user interface 102a, coupled to the device infrastructure 104, to interact with a user (e.g. server administrator—not shown). The user interface 102a can include one or more user input devices such as but not limited to a QWERTY keyboard, a keypad, a stylus, a mouse, a microphone and the user output device such as an LCD screen display and/or a speaker and as such can be used to embody the workflow interface 102. If the screen is touch sensitive, then the display can also be used as the user input device as controlled by the device infrastructure 104.

Referring again to FIG. 3, operation of the device is facilitated by the device infrastructure 104. The device infrastructure 104 includes one or more computer processors 108 and can include an associated memory 122 (e.g. memory 18). The computer processor 108 facilitates performance of the device configured for the intended task (e.g. of the respective service 22, 24, operator 20, and/or registrars 16) through operation of the network interface 101, the user interface 102 and other application programs/hardware of the device by executing task related instructions (e.g. 105). These task related instructions 105 can be provided by an operating system, and/or software applications located in the memory 122, and/or by operability that is configured into the electronic/digital circuitry of the processor(s) 108 designed to perform the specific task(s). Further, it is recognized that the device infrastructure 104 can include a computer readable storage medium 109 coupled to the processor 108 for providing instructions to the processor 108 and/or to load/update the instructions 105 (e.g. modules 25a,b). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device can include the executable applications comprising code or machine readable instructions for implementing predetermined functions/operations including those of an operating system and the modules, for example. The processor 108 as used herein is a configured device and/or set of machine-readable instructions for performing operations as described by example above, including those operations as performed by any or all of the modules. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the modules may be implemented in hardware, software or a combination of both. Accordingly, the use of a processor 108 as a device and/or as a set of machine-readable instructions is hereafter referred to generically as a processor/module for sake of simplicity. Further, it is recognised that the service 22, 24, registrar 16 and/or operator 20 can include one or more of the computing devices (comprising hardware and/or software) for implementing the modules, as desired.

It will be understood in view of the above that the computing devices may be, although depicted as a single computer system, may be implemented as a network of computer processors, as desired.

The invention claimed is:

1. A gateway server operating as a web service providing a self-serve methodology for establishing a domain name registry over a communications network using machine-to-machine interaction involving the gateway server and a computing device of a registry operator (RO) for the domain name registry, the gateway server comprising: a network interface for communicating with the computing device over the communications network; a processor and associated memory having instructions stored thereon for execution by the processor to communicate with the computing device by: receiving a request from the computing device to establish the domain name registry of a specified type; determining the specified type requires the Internet Corporation for Assigned Names and Numbers (ICANN) approval and receiving access credentials associated with the RO for an RO account with ICANN hosted on a server; using the access credentials to access via the communications network the RO account on the server for contributing to completion of a Registry Agreement with ICANN on behalf of the RO during an application phase of the self-serve methodology; collecting registry technical information for the domain name registry from the computing device; using the access credentials to access via the communications network the RO account on the server for communicating the registry technical information to the server on behalf of the RO during a registry testing phase of the self-serve methodology in order to complete registry services testing for the domain name registry with ICANN; and updating a workflow interface with a completion status of the registry testing phase for subsequent access by the computing device of the RO over the communications network.

2. The gateway server of claim 1, wherein the specified type is selected from the group consisting of an open membership domain name registry and a closed membership domain name registry.

3. The gateway server of claim 1, wherein the workflow interface is an Application Programming Interface (API) exposed by the gateway server to the computing device over the communications network.

4. The gateway server of claim 1, wherein the workflow interface is a dashboard accessible by the computing device over the communications network.

5. The gateway server of claim 1, wherein said contributing to the completion of the Registry Agreement includes querying the computing device for application information of the domain name registry, the application information relevant to said completion of the Registry Agreement.

6. The gateway server of claim 1, wherein said contributing to the completion of the Registry Agreement includes reviewing of the Registry Agreement prior to said completion of the Registry Agreement, said reviewing including confirming appropriate parameters relevant to the registry testing phase.

7. The gateway server of claim 1 further comprising querying the computing device for application information of the domain name registry, the application information relevant to said completion of the Registry Agreement, wherein information content of the application information is based the specified type.

8. The gateway server of claim 7 further comprising updating a completion status of receipt of the application information to the workflow interface.

9. The gateway server of claim 1, wherein a completion status of the application phase is updated to the workflow interface.

10. The gateway server of claim 1 further comprising receiving application information originating from ICANN from the computing device, the application information used in said completion of the Registry Agreement.

11. The gateway server of claim 1 further comprising communicating with the computing device in order to establish a Registry Services Agreement between the RO and a Registry Service Provider (RSP), the RSP associated with hosting of the gateway server.

12. The gateway server of claim 11, wherein the Registry Services Agreement is established before said communicating the registry technical information to the server.

13. The gateway server of claim 11 further comprising querying the computing device for technical services information detailing a list of technical services to be associated with the domain name registry.

14. The gateway server of claim 13 further comprising updating the workflow interface to indicate a completion status for receipt of the technical services information.

15. The gateway server of claim 13, wherein the said querying for the technical services information occurs before said complete of the registry testing phase.

16. The gateway server of claim 1 further comprising receiving and processing RSP account registration information via the computing device in order to establish an RSP account of the RO with the RSP, the RSP account for use by the computing device in accessing the workflow interface via the communications network.

17. The gateway server of claim 16, wherein said establish the RSP account occurs before said establishing the Registry Agreement.

18. The gateway server of claim 16, wherein said establish the RSP account occurs before said complete the registry services testing.

19. The gateway server of claim 1, wherein the Registry Agreement once completed is received from the server over the communications network and then subsequently provided by the gateway server to the computing device.

20. The gateway server of claim 19, wherein the Registry Agreement is made accessible to the computing device via the workflow interface.

21. The gateway server of claim 1 further comprising receiving an information request from the server and requesting further registry technical information from the computing device based on the information request.

22. The gateway server of claim 21 further comprising receiving the further registry technical information from the computing device and forwarding the further technical registry information to the server in order to facilitate said complete the registry services testing.

23. The gateway server of claim 11, wherein said communicating includes a set of terms and conditions for selection by the RO, such that when selected by the RO each selected item from the set of terms and conditions is included in the Registry Agreement as part of said completion.

24. The gateway server of claim 23, wherein a content of said each selected item is updated after said establish as a result of receiving technical services information detailing a list of technical services to be associated with the domain name registry.

25. A gateway server operating as a web service providing a self-serve methodology for establishing a domain name registry over a communications network using machine-to-machine interaction involving the gateway server and a computing device of a registry operator (RO) for the domain name registry, the gateway server comprising: a network interface for communicating with the computing device over the communications network; a processor and associated memory having instructions stored thereon for execution by the processor to communicate with the computing device by: receiving a request from the computing device to establish the domain name registry of a specified type; determining the specified type requires the Internet Corporation for Assigned Names and Numbers (ICANN) approval and receiving access credentials of the RO for an RO account with ICANN hosted on a server; confirming completion of a Registry Agreement between ICANN and the RO; collecting registry technical information for the domain name registry from the computing device; using the access credentials to access via the communications network the RO account on the server for communicating the registry technical information to the server on behalf of the RO during a registry testing phase of the self-serve methodology in order to complete registry services testing for the domain name registry with ICANN; and updating a workflow interface with a completion status of the registry testing phase for subsequent access by the computing device of the RO over the communications network.

26. A gateway server operating as a web service providing a self-serve methodology for establishing a domain name registry over a communications network using machine-to-machine interaction involving the gateway server and a computing device of a registry operator (RO) for the domain name registry, the gateway server comprising: a network interface for communicating with the computing device over the communications network; a processor and associated memory having instructions stored thereon for execution by the processor to communicate with the computing device by: receiving a request from the computing device to establish the domain name registry of a specified type; determining the specified type requires the Internet Corporation for Assigned Names and Numbers (ICANN) approval and receiving access credentials of the RO for an RO account with ICANN hosted on a server; confirming completion of a registry testing phase, said completion based on registry technical information for the domain name registry collected from the computing device; collecting launch phase parameters for the domain name registry from the computing device, the launch phase parameters for use during a launch phase of the self-serve methodology; using the access credentials to access via the communications network the RO account on the server for communicating the launch phase parameters to the server on behalf of the RO during the launch phase in order to complete a configuration of the launch phase for the domain name registry with ICANN; and updating a workflow interface with a completion status of said configuration of the launch phase for subsequent access by the computing device of the RO over the communications network.

* * * * *